US012437626B2

(12) United States Patent
Yu et al.

(10) Patent No.: US 12,437,626 B2
(45) Date of Patent: Oct. 7, 2025

(54) IOT-BASED LOCAL MONITORING WORKPLACE SAFETY MANAGEMENT SYSTEM AND WORKPLACE SAFETY MANAGEMENT METHOD USING SAME

(71) Applicant: SAMSUNG C&T CORPORATION, Seoul (KR)

(72) Inventors: Jiyong Yu, Seoul (KR); Seonkyung Chu, Bucheon-si (KR); Taeha Park, Seoul (KR); Kwangku Do, Yongin-si (KR); Mungi Kang, Goyang-si (KR); Dongkeun Kim, Osan-si (KR); Inhyuck Choi, Seoul (KR); Euntack Lee, Seoul (KR); Soonjin Hong, Seoul (KR)

(73) Assignee: SAMSUNG C&T CORPORATION, Seoul (KR)

( * ) Notice: Subject to any disclaimer, the term of this patent is extended or adjusted under 35 U.S.C. 154(b) by 87 days.

(21) Appl. No.: 18/251,690

(22) PCT Filed: Oct. 25, 2021

(86) PCT No.: PCT/KR2021/015030
§ 371 (c)(1),
(2) Date: May 3, 2023

(87) PCT Pub. No.: WO2022/097978
PCT Pub. Date: May 12, 2022

(65) Prior Publication Data
US 2023/0410628 A1  Dec. 21, 2023

(30) Foreign Application Priority Data
Nov. 4, 2020  (KR) .................. 10-2020-0146149

(51) Int. Cl.
*G08B 21/12*  (2006.01)
*H04W 4/38*  (2018.01)
*H04W 84/18*  (2009.01)

(52) U.S. Cl.
CPC .............. *G08B 21/12* (2013.01); *H04W 4/38* (2018.02); *H04W 84/18* (2013.01)

(58) Field of Classification Search
CPC ........ G08B 21/12; G08B 21/22; G08B 21/02; G16Y 40/10; G16Y 40/50; G16Y 40/60;
(Continued)

(56) References Cited

U.S. PATENT DOCUMENTS 9,811,955 B2 * 11/2017 Russell .................. G06Q 90/00
9,888,337 B1 * 2/2018 Zalewski ........... G06Q 30/0635
(Continued)

FOREIGN PATENT DOCUMENTS

KR  10-1907964       10/2018
KR  101907964 B1 *  10/2018
(Continued)

OTHER PUBLICATIONS

International Search Report for International Application No. PCT/KR2021/015030, dated Feb. 8, 2022.

*Primary Examiner* — Adnan Aziz
(74) *Attorney, Agent, or Firm* — KILE PARK REED & HOUTTEMAN PLLC

(57) ABSTRACT

In accordance with the present invention, there is provided a workplace safety management system including: a plurality of node units (100) installed in a workplace area (1); a local server (200) that is movable and is connected to a management server (10) by wireless communication; and a tag (300) attached to a worker, in which the node unit (100) and the local server (200) is connected through a network system (400), the network system (400) includes: a long-
(Continued)

range network (410) connecting the node unit (100) to the local server (200); and a mesh network (420) connecting the plurality of node units 100 to each other, and the mesh network (420) connects the node unit (100) to the local server (200).

15 Claims, 7 Drawing Sheets

(58) Field of Classification Search
CPC ........ G16Y 20/01; G06Q 50/10; G06Q 50/08; H04W 4/38; H04W 84/18; H04W 4/70; H04W 4/80; H04W 84/10; H04W 88/08; H04L 12/66; Y02D 30/70
See application file for complete search history.

(56) References Cited

U.S. PATENT DOCUMENTS

| | | | |
|---|---|---|---|
| 11,341,830 B2* | 5/2022 | Al-Yousef | G05B 23/0267 |
| 11,803,955 B1* | 10/2023 | Pandya | G01S 17/42 |
| 2017/0270761 A1 | 9/2017 | Jones | |
| 2018/0122219 A1* | 5/2018 | Caterino | H04L 9/3226 |
| 2019/0343429 A1* | 11/2019 | Elhawary | A61B 5/6823 |
| 2020/0145257 A1* | 5/2020 | Samudrala | H04L 12/66 |
| 2021/0174952 A1* | 6/2021 | Leong | H04L 67/12 |
| 2021/0224721 A1* | 7/2021 | Morgenthau | H04W 52/0216 |
| 2021/0280324 A1* | 9/2021 | Roy | H04W 84/18 |
| 2022/0022284 A1* | 1/2022 | Foster | H04W 88/06 |
| 2022/0172594 A1* | 6/2022 | Cho | G08B 7/06 |
| 2023/0046739 A1* | 2/2023 | Sobol | H04L 41/16 |

FOREIGN PATENT DOCUMENTS

| | | | | |
|---|---|---|---|---|
| KR | 10-1914228 | | 11/2018 | |
| KR | 101914228 B1 | * | 11/2018 | |
| KR | 10-2023465 | | 9/2019 | |
| KR | 102023465 B1 | * | 9/2019 | |
| KR | 20200025666 A | * | 3/2020 | ......... H04W 84/042 |
| KR | 10-2020-0112361 | | 10/2020 | |
| KR | 1020200112361 A | * | 10/2020 | |

* cited by examiner

[FIG. 1]
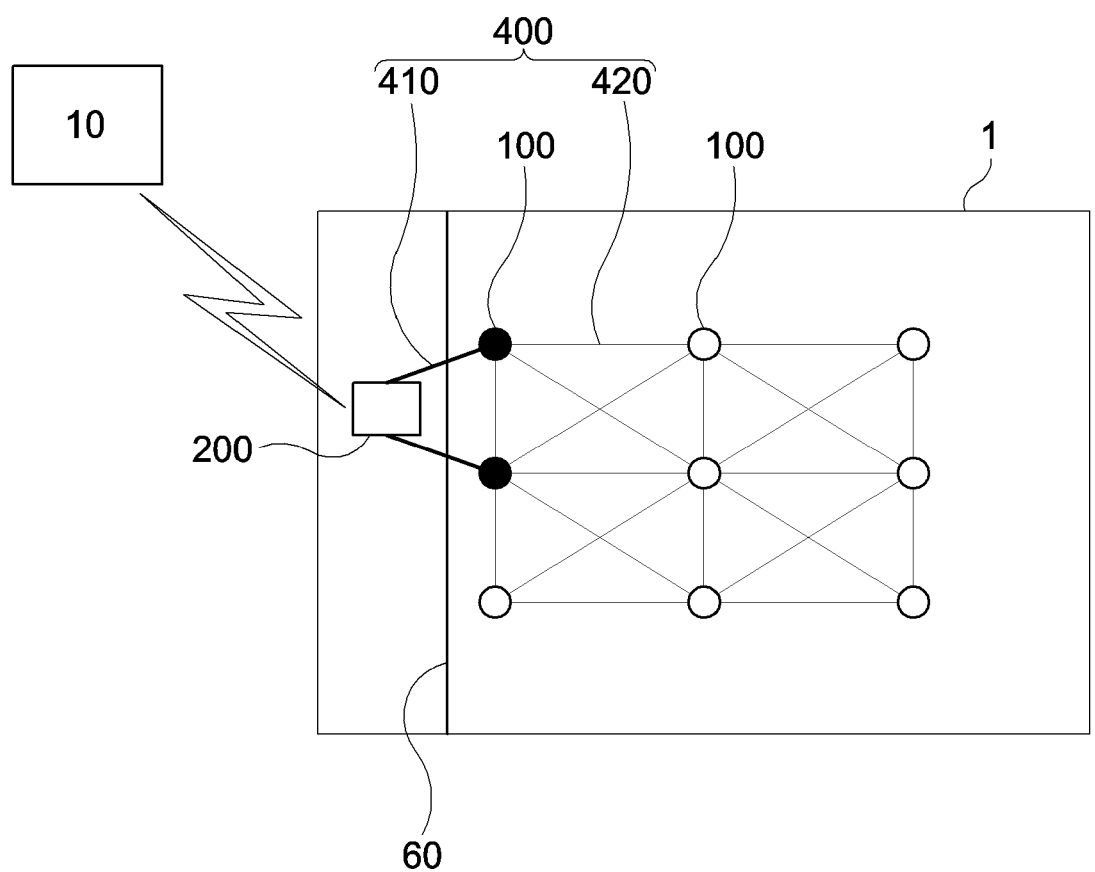

[FIG. 2]
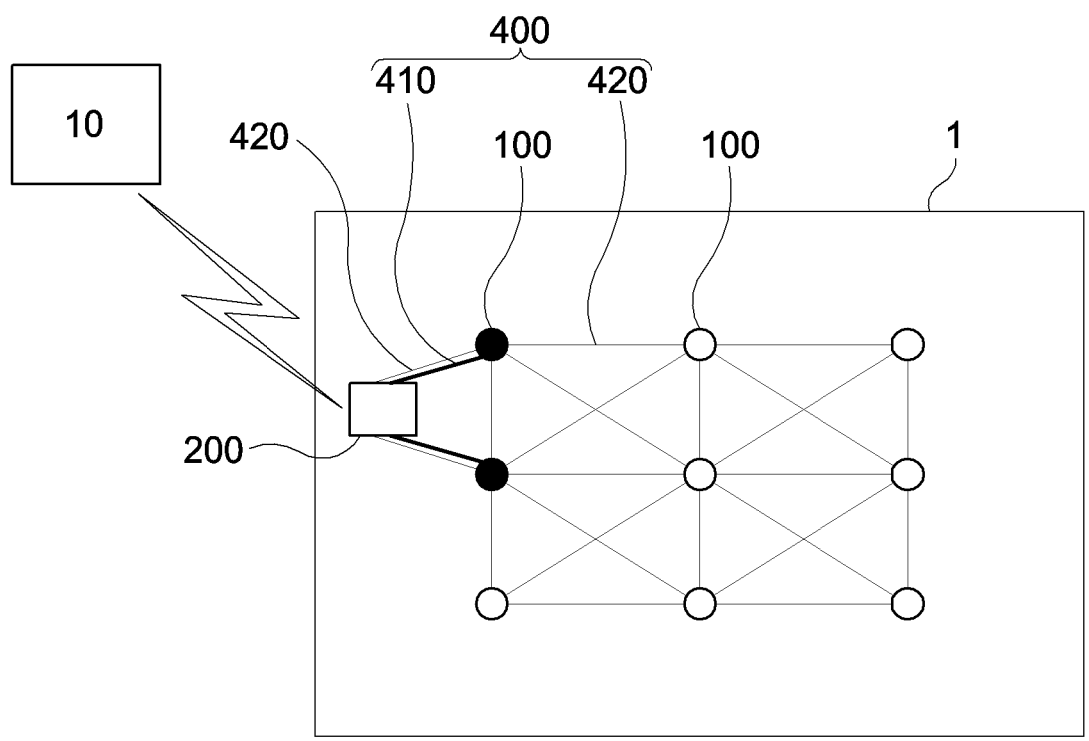

[FIG. 3]
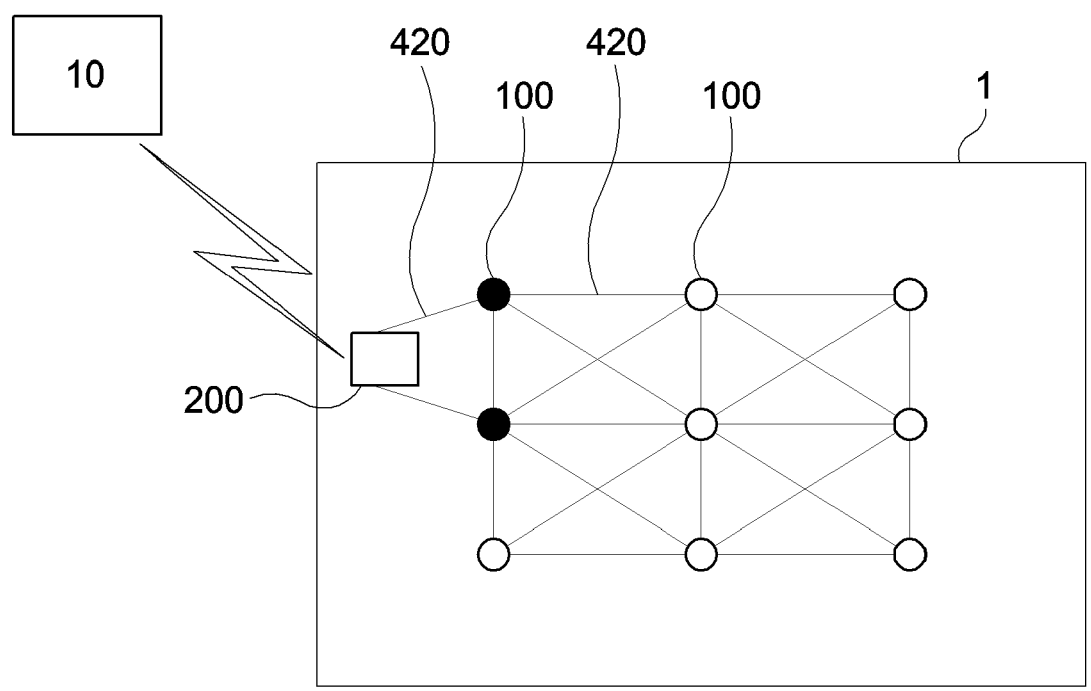

【FIG. 4】
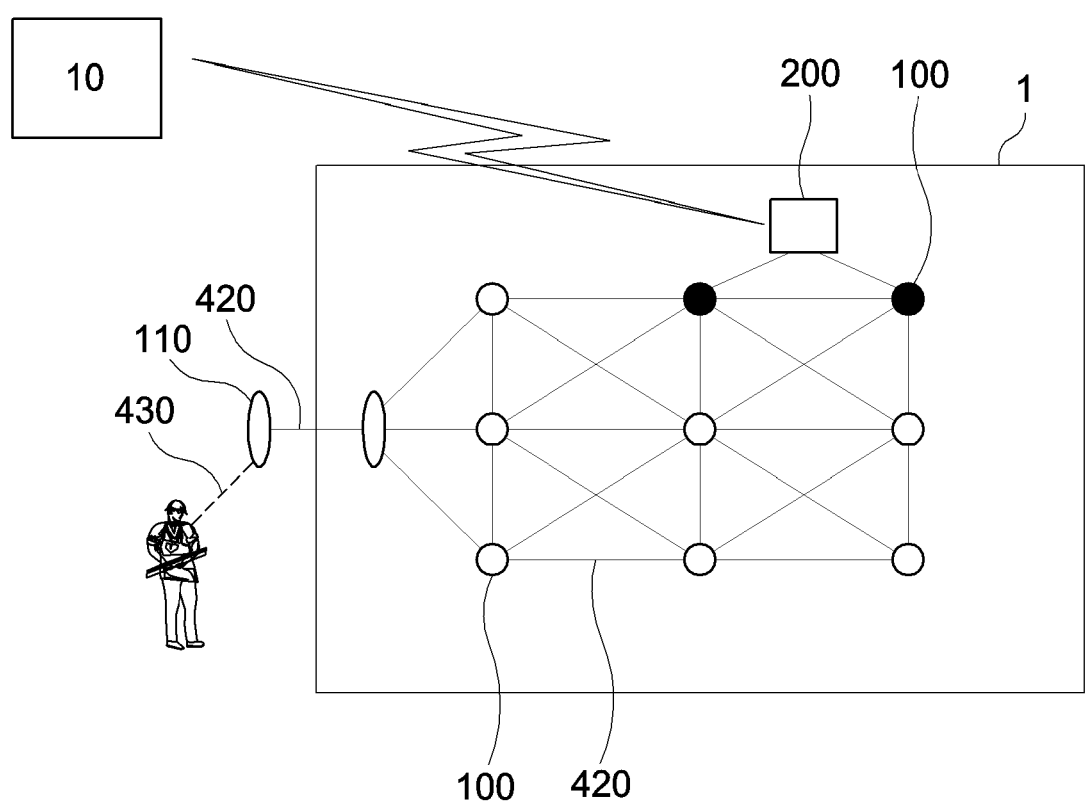

[FIG. 5]
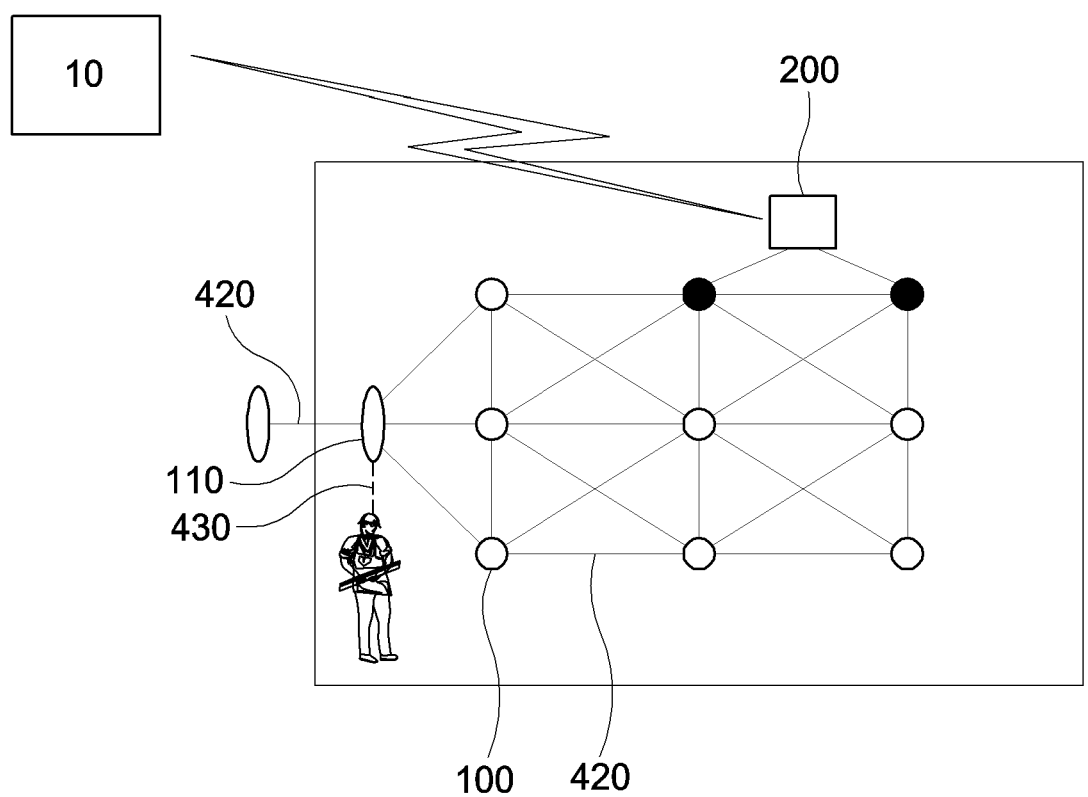

[FIG. 6]
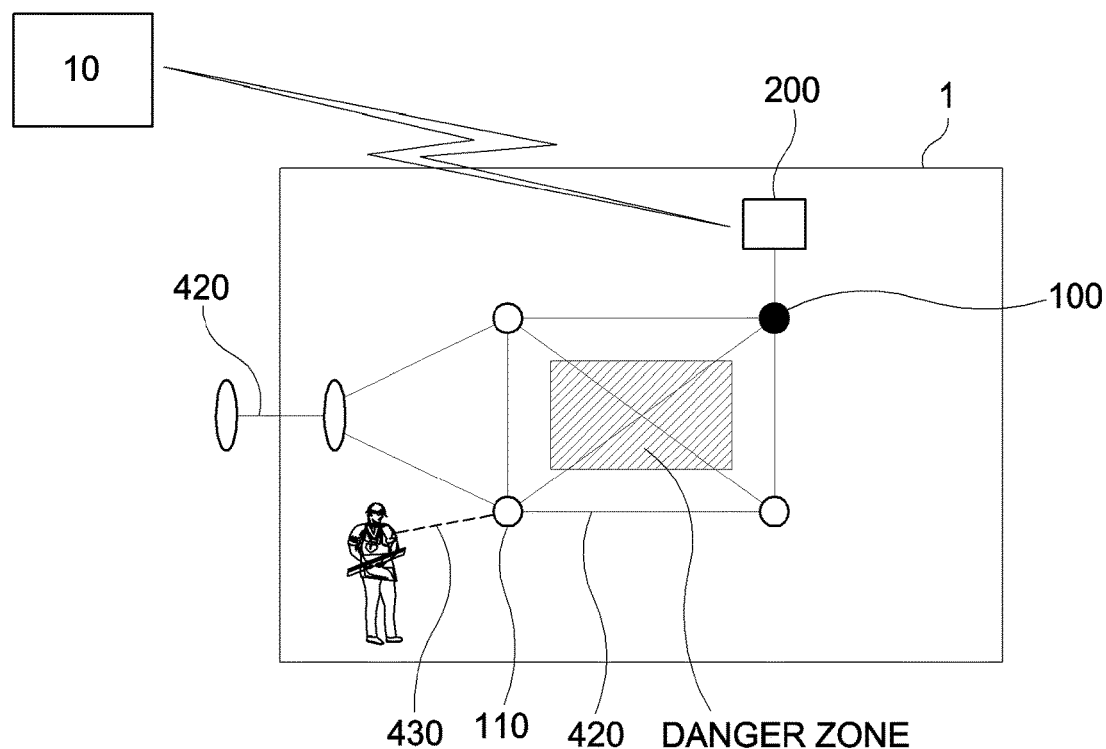

[FIG. 7]
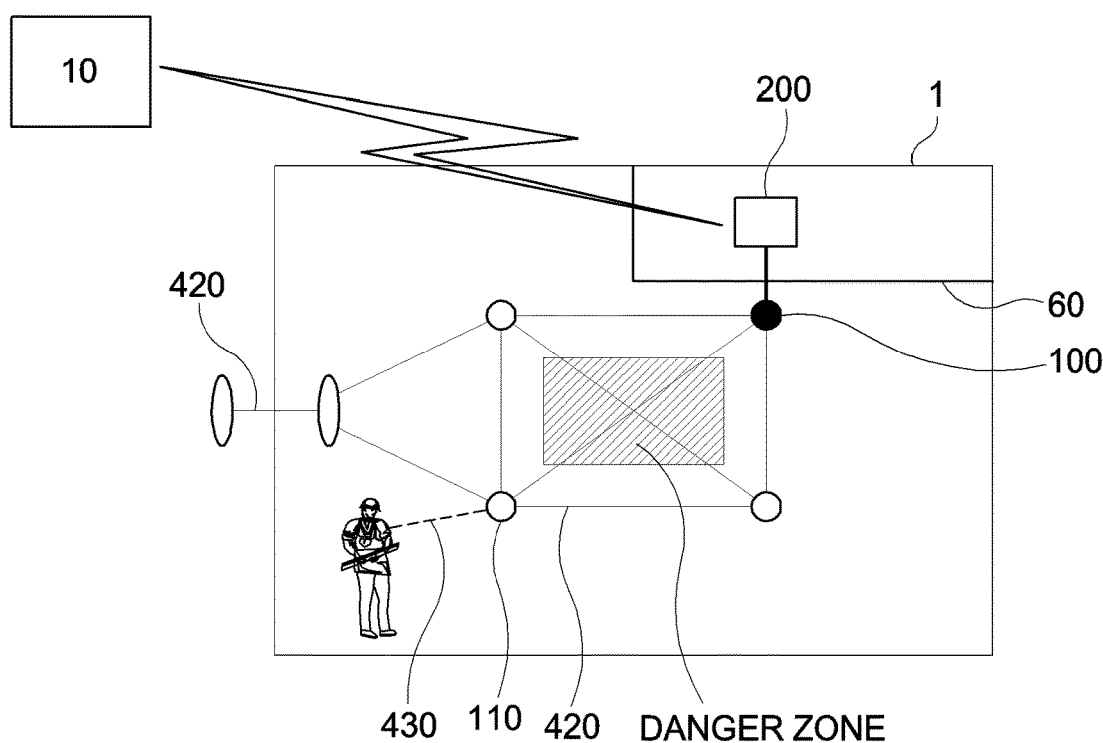

IOT-BASED LOCAL MONITORING WORKPLACE SAFETY MANAGEMENT SYSTEM AND WORKPLACE SAFETY MANAGEMENT METHOD USING SAME

TECHNICAL FIELD

The present invention disclosed herein relates to an IoT-based local monitoring workplace safety management system and a workplace safety management method using the same, capable of being reused, responding to sudden emergencies by minimizing a battery consumption of each unit, by connecting a node unit installed in a workplace to an external management server using a mobile local server, ensuring convenience of maintenance, and stably managing the workplace even without large-scale facility investment.

BACKGROUND ART

In general, a construction site is located far from a head office, and thus, there is a problem in that the head office manages overall information about the construction site, such as worker's personal information, commuting status, salary, safety management, and construction material information, systematically and in real-time.

At most construction sites, due to severe fluctuations in the number of employees and hours, losses occur in a cost settlement process, and to manage this, documents such as attendance records are prepared, but it is not possible to quickly share information between the site and the head office, and thus, in order to improve it, the use of barcodes or RFID cards is introduced; however, the barcode or RFID card is very inefficient in terms of utilization and also lowers work productivity because it simply manages the attendance record of workers.

In addition, many heavy equipment is constantly moving at a construction site, and elements that threaten the safety of workers such as cliffs and puddles are scattered. However, due to the absence of a system that warns workers of danger when the workers approach heavy equipment that is working or get close to a cliff or puddle, safety accidents occur frequently at construction sites, and in the event of an accident, it is difficult to quickly identify the location, and thus the number of casualties is increasing.

In addition, since most of the existing workplace safety management systems are built on the basis of a central control system, large-scale facility investment costs are incurred in constructing the system on site and the difficulty in installation and maintenance is high. In addition, since the workplace safety management system is not possible to reuse, there has been a problem in that excessive costs are required to build the management system.

DISCLOSURE OF THE INVENTION

Technical Problem

The present invention has been derived to solve the problems of the above-mentioned workplace safety management system in the related art, and an object of the present invention is to provide an IoT-based local monitoring workplace safety management system and a workplace safety management method using the same, capable of being built at a low cost and being reused.

Another object of the present invention is to provide an IoT-based local monitoring workplace safety management system and a workplace safety management method using the same, capable of increasing a battery utilization efficiency of a node unit installed in a workplace and minimizing a blind spot of sensing by using various networks such as a long-range network (LoRa) and a proximity network (Wifi, Bluetooth) together.

Still another object of the present invention is to provide an IoT-based local monitoring workplace safety management system and a workplace safety management method using the same, capable of smoothly transmitting information even under problem situations such as packet loss due to disconnection of some communication networks or overload of communication information by transmitting information on workplace safety management to a management server and a local server using various communication networks.

Technical Solution

In accordance with an embodiment of the present invention, there is provided a workplace safety management system including: a plurality of node units (100) installed in a workplace area (1); a local server (200) that is movable and is connected to a management server (10) by wireless communication; and a tag (300) attached to a worker, in which the node unit (100) and the local server (200) are connected through a network system (400), the network system (400) includes: a long-range network (410) connecting the node unit (100) to the local server (200); and a mesh network (420) connecting the plurality of node units 100 to each other, and the mesh network (420) connects the node unit (100) to the local server (200).

In this case, in the workplace safety management system, the long-range network (410) may connect only the node unit 100 located within a predetermined distance (a) from the local server (200) to the local server (200).

Further, in the workplace safety management system, the local server (200) may generate: LoRa network information (511) about the node unit (100) connected through the long-range network (410); and mesh network information (512) about the node unit (100) connected through the mesh network (420).

Further, in the workplace safety management system, a plurality of the node units (100) not connected to the local server (200) through the long-range network (410) may be connected to the node units 100 connected to the local server (200) through the mesh network (420).

Further, in the workplace safety management system, the network system (400) may further include a node network (430) connecting the tag (300) and the node unit (100).

Further, in the workplace safety management system, the node unit (100) may include a designated node unit (110), and the designated node unit (110) may generate tag connection information (520) when the tag (300) and the designated node unit (110) are connected through the node network (430).

Further, in the workplace safety management system, the tag connection information (520) may be transmitted to the node unit (100) connected to the local server (200) through the mesh network (420), and the tag connection information (520) transmitted to the node unit (100) connected to the local server (200) may be transmitted to the management server (10).

Further, in the workplace safety management system, the tag connection information (520) may be worker access information (521).

Further, in the workplace safety management system, the tag connection information (520) may be worker danger zone proximity information (522).

Further, in the workplace safety management system, the node unit (100) may include a sensor (120) for generating hazardous substance exposure information (530) by sensing a hazardous substance.

Further, in the workplace safety management system, the hazardous substance exposure information (530) may be transmitted to the node unit (100) connected to the local server (200) through the mesh network (420), and the hazardous substance exposure information (530) transmitted to the node unit (100) connected to the local server (200) may be transmitted to the management server (10).

Further, in the workplace safety management system, the hazardous substance exposure information (530) may be transmitted to the other node units (100) other than the node unit (100) that has generated the hazardous substance exposure information (530) through the mesh network (420), and the hazardous substance exposure information (530) transmitted to the node unit (100) may be transmitted to the tag (300) through the node network (430).

In accordance with another embodiment of the present invention, there is provided a workplace safety management method using the workplace safety management system, the workplace safety management method including: a first step (A100) of generating the tag connection information (520) using the designated node unit (110); a second step (A200) of transmitting the tag connection information (520) to the node unit (100) connected to the local server (200) using the mesh network (420); and a third step (A300) of transmitting the tag connection information (520) to the local server (200) using the long-range network (410).

In this case, in the workplace safety management method, the third step (A300) may be performed when there is no local server (200) connected to the node unit (100) through the mesh network (420).

In accordance with still another embodiment of the present invention, there is provided a workplace safety management method using the workplace safety management system, the workplace safety management method including: a first step (S100) of generating the hazardous substance exposure information (530) using the sensor (120); a second step (S200) of transmitting the hazardous substance exposure information (530) to the node unit (100) connected to the local server (200) using the mesh network (420); and a third step (S300) of transmitting the hazardous substance exposure information (530) to the local server (200) using the long-range network (410).

In this case, in the workplace safety management method, the third step (S300) may be performed when there is no local server (200) connected to the node unit (100) through the mesh network (420).

Advantageous Effects

In accordance with the present invention, there is an effect of constructing a workplace safety management system capable of being built at a low cost and capable of being reused.

In accordance with the present invention, there is an effect of increasing a battery utilization efficiency of a node unit installed in a workplace and minimizing a blind spot of sensing by using various networks such as a long-range network (LoRa) and a proximity network (Wifi, Bluetooth) together.

In accordance with the present invention, it is possible to smoothly transmit information even under problem situations such as packet loss due to disconnection of some communication networks or overload of communication information by transmitting information on workplace safety management to a management server and a local server using various communication networks, and thus there is an effect of increasing stability of the workplace safety management.

BRIEF DESCRIPTION OF THE DRAWINGS

FIG. 1 is a view showing a state in which a local server and node units of a workplace safety management system in accordance with an embodiment of the present invention are connected through a long-range network;

FIG. 2 is a view showing a state in which the local server and node units of the workplace safety management system in accordance with an embodiment of the present invention are connected through the long-range network and a mesh network;

FIG. 3 is a view showing a state in which only the mesh network is selected and connected in the state in which the local server and node units of the workplace safety management system in accordance with an embodiment of the present invention are connected through the long-range network and the mesh network;

FIG. 4 is a view showing a state in which a tag and a designated node unit of the workplace safety management system in accordance with an embodiment of the present invention are connected through a node network;

FIG. 5 is a view showing another state in which a tag and a designated node unit of the workplace safety management system in accordance with an embodiment of the present invention are connected through the node network;

FIG. 6 is a view showing a state in which the tag and a designated node unit in the vicinity of a danger zone of the workplace safety management system in accordance with an embodiment of the present invention are connected through the node network; and FIG. 7 is a view showing a state in which a node unit is connected to the local server through the long-range network in the state in which the tag and the designated node unit in the vicinity of the danger zone of the workplace safety management system in accordance with an embodiment of the present invention are connected through the node network.

MODE FOR CARRYING OUT THE INVENTION

An embodiment of an IoT-based local monitoring workplace safety management system and a workplace safety management method using the same in accordance with the present invention will be described in detail with reference to the accompanying drawings, and in the description with reference to the accompanying drawings, the same or corresponding components are given the same reference numerals, and duplicate descriptions thereof will be omitted.

In addition, terms "first", "second", etc., used below are merely identifying symbols for distinguishing the same or corresponding components, and the same or corresponding components are not limited by terms, "first", "second", etc.

Furthermore, in a contact relationship between respective components, the term "coupled" is used to cover not only a meaning of the case of direct physical contact between the components, but also a concept under which other components are interposed between the components and the components contact other components.

The present invention relates to an IoT-based local monitoring workplace safety management system capable of preventing safety accidents in workplaces such as construction sites, grasping a work force flow situation, managing workers' entry and exit, and human accidents due to exposure to harmful substances.

As compared to a workplace management system in the related art that is operated by a centralized control system in a central control room outside the workplace, the workplace safety management system in accordance with the present invention has characteristics of being able to be built as an efficient workplace safety management system without excessive facility investment by grafting various IoT and network systems on a local server 200 developed in a bag-shaped package type, and of being able to be reused by being constructed with units that is possible to install and move.

In addition, the workplace safety management system in accordance with the present invention has an advantage of increasing the stability and efficiency of system operation by using various network systems that meet a management purpose together, instead of using only one network channel.

Specifically, the workplace safety management system in accordance with an embodiment of the present invention may include a plurality of node units 100 installed in a workplace area 1, a local server 200 that is movable and connected to a management server 10 formed outside the workplace area 1 by wireless communication, and a tag 300 attached to a worker (FIGS. 1 and 2).

The node unit 100 is a wireless communication device installed in the workplace area 1, and plays a role of a gateway of a long-range network (LoRa) for long-distance communication and serves to form a mesh network using short-distance communication (Wifi, Bluetooth), and a tag (to be described later) 300) and to connect a network through short-range communication with the tag 300 to be described below.

The node unit 100 and the local server 200 are connected through a network system 400, and the network system 400 includes a long-range network 410 for connecting the node units 100 to the local server 200 and a mesh network 420 for connecting the plurality of local node units 100 to each other (FIG. 1).

In this case, the long-range network 410 may connect only the node units 100 located within a predetermined distance a from the local server 200 to the local server 200 (FIGS. 1 and 2).

The long-range network 410 has an advantage of having a longer communication distance than the mesh network 420, but has disadvantages of slow communication speed and poor real-time performance.

Accordingly, in order to minimize the disadvantages while using the advantage of the long-range network 410, the present invention is characterized by ensuring efficiency of information collection and transmission by connecting only the node units 100 adjacent to the local server 200 to the local server 200 using the long-range network 410 and maintaining the long-range network 410 of other node units 100 in an inactive state and exchanging information between the node units 100 through the mesh network 420.

In this case, the node unit 100 connected to the local server 200 through the long-range network 410 may be connected to the local server 200 through the mesh network 420 at the same time.

Accordingly, the present invention obtains the following effects.

First, when the local server 200 may be connected to the node unit 100 through short-range communication, that is, the mesh network 420, information about the node unit 100 may be transmitted to the local server 200 through the mesh network capable of rapidly transmitting information in real time.

Second, when the node unit 100 is located underground or installed in a location where short-range communication is not smooth, the local server 200 may be connected to the node unit 100 through long-distance communication, that is, the long-range network 410, to transmit information about the node unit 100 to the local server 200. In this case, the node units 100 connected to the long-range network 410 may be limited to only the node units 100 located within the predetermined distance a from the local server 200, and the node units 100 may collect information from each other through the mesh network 420, and transmit the collected information to the local server 200 and the management server 10 through the node units 100 connected to the local server 200 through the long-range network 410.

That is, a plurality of node units 100 not connected to the local server 200 through the long-range network 410 may be connected to the node units 100 connected to the local server 200 through the mesh network 420 and may indirectly transmit information to the local server 200.

Third, when the local server 200 is connected to the node unit 100 using both the long-range network 410 and the mesh network 420, it is possible to exchange information by activating only the mesh network 420. Accordingly, information about workplace safety management may be transmitted and received through a network with high stability and efficiency among connected networks.

The local server 200 of the workplace safety management system in accordance with an embodiment of the present invention may generate LoRa network information 511 about the node unit 100 connected through the long-range network 410 and mesh network information 512 about the node unit 100 connected through the mesh network 420.

Accordingly, it is possible for an administrator to select the network system 400 suitable for a situation or to activate only the mesh network 420 through a controller.

In accordance with an embodiment of the present invention, the network system 400 may further include a node network 430 connecting the tag 300 and the node unit 100.

The node network 430 preferably utilizes a short-range network such as a WiFi or a Bluetooth communication network.

In accordance with the present invention, when some of the plurality of node units 100 are designated as designated node units 110 and the tag 300 is connected to a designated node unit 110 through the node network 430, the designated node unit 110 may generate tag connection information 520.

The tag connection information 520 may be used as worker access information 521, worker danger zone proximity information 522, or the like.

To this end, the tag connection information 520 may be transmitted to the node unit 100 connected to the local server 200 through the mesh network 420, and the tag connection information 520 transmitted to the node unit 100 connected to the local server 200 may be transmitted to the management server 10.

In this case, when there is no node unit 100 connected to the local server 200 through the mesh network 420, the tag connection information 520 may be transmitted to the node unit 100 connected to the local server 200 through the long-range network 410.

In accordance with an embodiment of the present invention, the node unit 100 may include a sensor 120 for sensing hazardous substances and generating hazardous substance exposure information 530.

In this case, the hazardous substance exposure information 530 may be transmitted to the node unit 100 connected to the local server 200 through the mesh network 420 and the hazardous substance exposure information 530 transmitted to the node unit 100 connected to the local server 200 may be transmitted to the management server 10 through the local server 200.

In addition, the hazardous substance exposure information 530 may be transmitted to other node units 100 other than the node unit 100 that has generated the hazardous substance exposure information 530 through the mesh network 420. The hazardous substance exposure information 530 transmitted to the node unit 100 may be transmitted to the tag 300 through the node network 430, so that the information may be exposed to a worker.

Hereinafter, a workplace safety management method using the workplace safety management system in accordance with an embodiment of the present invention will be described.

A workplace safety management method in accordance with the present invention may include a first step A100 of generating the tag connection information 520 using the designated node unit 110, a second step A200 of transmitting the tag connection information 520 to the node unit 100 connected to the local server 200 using the mesh network 420, and a third step A300 of transmitting the tag connection information 520 to the local server 200 using the long-range network 410.

In this case, it is desirable that the third step A300 is performed when there is no local server 200 connected to the node unit 100 through the mesh network 420.

A workplace safety management method in accordance with another aspect of the present invention may include a first step S100 of generating the hazardous substance exposure information 530 using the sensor 120, a second step S200 of transmitting the hazardous substance exposure information 530 to the node unit 100 connected to the local server 200 using the mesh network 420, and a third step S300 of transmitting the hazardous substance exposure information 530 to the local server 200 using the long-range network 410.

In this case, it is desirable that the third step S300 is performed when there is no local server 200 connected to the node unit 100 through the mesh network 420.

In the above, some preferable exemplary embodiments, which may be implemented by the present invention, have been described, and therefore, as is well known, the scope of the present invention should not be interpreted while being limited to the above exemplary embodiments, and all of the technical spirits including the common basis of the present invention are included in the scope of the present invention.

INDUSTRIAL APPLICABILITY

The present technology is recognized for industrial applicability as a workplace safety management system.

SEQUENCE LISTING FREE TEXT

1: workplace area
10: management server

100: node unit
200: local server
300: tag
400: network system

What is claimed is:

1. A workplace safety management system comprising:
a plurality of node units (100) installed in a workplace area (1);
a mobile local server (200) that is movable and is connected to a management server (10) by wireless communication; and
a tag (300) attached to a worker,
wherein the plurality of node units (100) and the mobile local server (200) are connected through a network system (400),
the network system (400) includes
a long-range network (410) connecting the plurality of node units (100) to the mobile local server (200), and
a mesh network (420) connecting the plurality of node units to each other, and
the mesh network (420) connects the plurality of node units (100) to the mobile local server (200),
wherein the long-range network (410) connects only one of the plurality of node units (100) to the mobile local server (200) while being located within a predetermined distance (a) from the mobile local server (200), and
wherein the only one of the plurality of node units (100) adjacent to the mobile local server (200) is configured to use the long-range network (410), and
wherein the workplace safety management system is configured to maintain the long-range network (410) of any other plurality of node units (100) in an inactive state and is configured to exchange information between the any other plurality of node units (100) through the mesh network (420).

2. The workplace safety management system of claim 1, wherein the mobile local server (200) generates:
LoRa network information (511) about the plurality of node units (100) connected through the long-range network (410); and
mesh network information (512) about the plurality of node units (100) connected through the mesh network (420).

3. The workplace safety management system of claim 2, wherein a plurality of the node units (100) not connected to the mobile local server (200) through the long-range network (410) are connected to the mobile local server (200) through the mesh network (420).

4. The workplace safety management system of claim 3, wherein the network system (400) further includes a node network (430) connecting the tag (300) and the plurality of node units (100).

5. The workplace safety management system of claim 4, wherein the plurality of node units (100) includes a designated node unit (110), and the designated node unit (110) generates tag connection information (520) when the tag (300) and the designated node unit (110) are connected through the node network (430).

6. The workplace safety management system of claim 5, wherein the tag connection information (520) is transmitted to the plurality of node units (100) connected to the mobile local server (200) through the mesh network (420), and the tag connection information (520) transmitted to the plurality of node units (100) connected to the mobile local server (200) is transmitted to the management server (10).

7. The workplace safety management system of claim 6, wherein the tag connection information (520) is worker access information (521).

8. The workplace safety management system of claim 6, wherein the tag connection information (520) is worker danger zone proximity information (522).

9. The workplace safety management system of claim 6, wherein the plurality of node units (100) each include a sensor (120) for generating hazardous substance exposure information (530) by sensing a hazardous substance.

10. The workplace safety management system of claim 9, wherein the hazardous substance exposure information (530) is transmitted to the plurality of node units (100) connected to the mobile local server (200) through the mesh network (420), and the hazardous substance exposure information (530) transmitted to the plurality of node units (100) connected to the mobile local server (200) is transmitted to the management server (10).

11. The workplace safety management system of claim 10, wherein the hazardous substance exposure information (530) is transmitted to a plurality of node units (100) other than the node unit (100) that has generated the hazardous substance exposure information (530) through the mesh network (420), and the hazardous substance exposure information (530) transmitted to the plurality of node units (100) other than the node unit (100) is transmitted to the tag (300) through the node network (430).

12. A workplace safety management method using the workplace safety management system of claim 7, the workplace safety management method comprising:

a first step (A100) of generating the tag connection information (520) using the designated node unit (110);

a second step (A200) of transmitting the tag connection information (520) to the plurality of node units (100) connected to the mobile local server (200) using the mesh network (420); and a third step (A300) of transmitting the tag connection information (520) to the mobile local server (200) using the long-range network (410).

13. The workplace safety management method of claim 12, wherein the third step (A300) is performed when there is no mobile local server (200) connected to the plurality of node units (100) through the mesh network (420).

14. A workplace safety management method using the workplace safety management system of claim 12, the workplace safety management method comprising:

a first step (S100) of generating the hazardous substance exposure information (530) using the sensor (120);

a second step (S200) of transmitting the hazardous substance exposure information (530) to the plurality of node units (100) connected to the mobile local server (200) using the mesh network (420); and a third step (S300) of transmitting the hazardous substance exposure information (530) to the mobile local server (200) using the long-range network (410).

15. The workplace safety management method of claim 14, wherein the third step (S300) is performed when there is no mobile local server (200) connected to the plurality of node units (100) through the mesh network (420).

* * * * *